United States Patent [19]

Roberts

[11] 3,864,458
[45] Feb. 4, 1975

[54] FLUID BED INCINERATION OF CHLORIDE-CONTAINING WASTE STREAMS

[75] Inventor: Ellicott J. Roberts, Westport, Conn.

[73] Assignee: Dorr-Oliver Incorporated, Stamford, Conn.

[22] Filed: June 11, 1973

[21] Appl. No.: 368,535

[52] U.S. Cl. .............. 423/481, 423/482, 423/551, 423/552, 423/554, 423/555
[51] Int. Cl. ....... C01b 7/08, C01d 5/00, C01f 11/40
[58] Field of Search .......... 423/481, 482, 614, 551, 423/552, 554, 555

[56] References Cited
UNITED STATES PATENTS

| 1,500,289 | 7/1924 | Weber .................... 423/482 |
| 1,923,324 | 8/1933 | Mitchell .................. 423/482 |
| 2,336,180 | 12/1943 | Lippman, Jr. et al. ...... 423/482 |
| 2,706,144 | 4/1955 | Cannon .................. 423/552 |
| 2,706,145 | 4/1955 | Cannon .................. 423/552 |
| 3,563,701 | 2/1971 | Cannon ................ 423/555 X |
| 3,642,441 | 2/1972 | Van Weert ............... 423/481 |

Primary Examiner—Edward Stern
Attorney, Agent, or Firm—H. M. Snyder; Burtsell J. Kearns; Theodore M. Jablon

[57] ABSTRACT

Combustible waste materials containing chlorides are incinerated in a fluid bed reactor by a process in which formation of low-melting eutectics is avoided. Relatively refractory sulfate compounds are instead produced by the introduction of sulfur into the fluid bed and the chlorides pass off as HCl.

9 Claims, 1 Drawing Figure

PATENTED FEB 4 1975
3,864,458
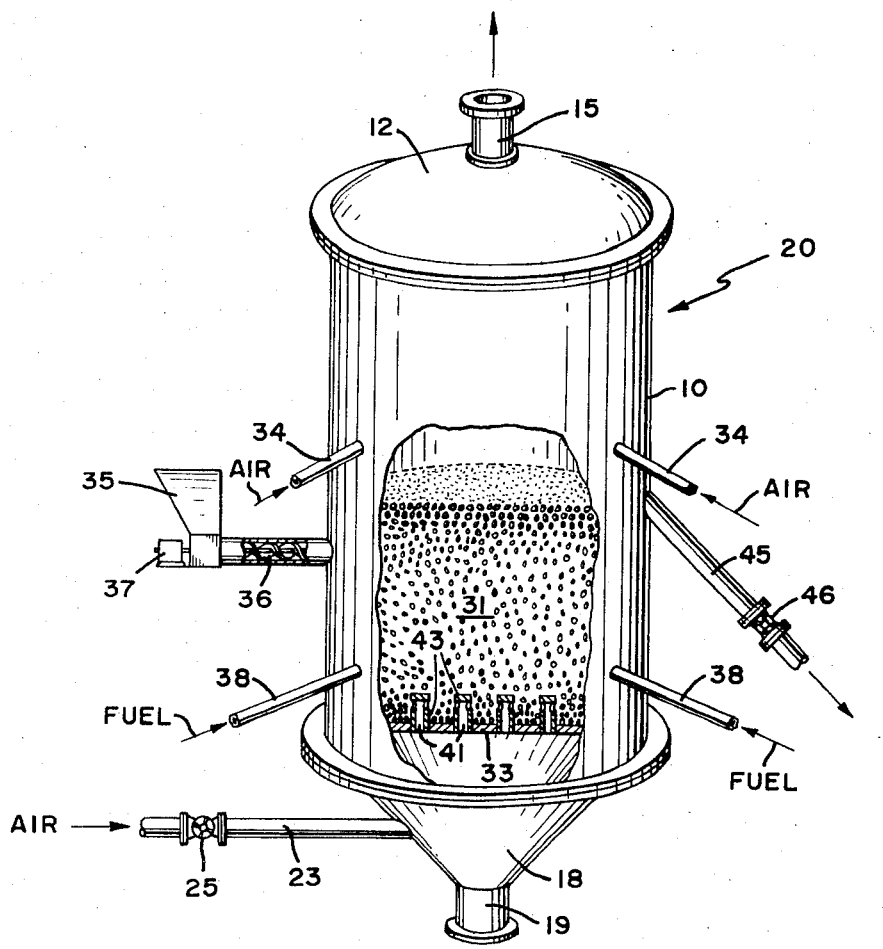

# 3,864,458

FLUID BED INCINERATION OF CHLORIDE-CONTAINING WASTE STREAMS

This invention is directed to the incineration in a fluid bed reactor of combustible waste streams which have a high chloride content.

Fluid bed reactors have been successfully applied to the incineration of combustible waste streams such as sewage sludge and oil refinery wastes. In these reactors a bed of inert particles, sand, for example, is supported on a gas distribution or constriction plate. Air or another gas is passed through the constriction plate to "fluidize" the inert particles. Initially, after raising the bed temperature to a suitable level, fuel is injected into the bed and ignited to raise the bed to operating temperature and then the combustible waste is introduced. The waste undergoes combustion, generating a substantial amount of heat which makes it possible to reduce the amount of fuel introduced and, in some cases, may eliminate the necessity for the auxiliary fuel.

The purposes of the fluid bed incinerators is to completely consume the organic matter in the waste feed stream, leaving as a residue only an inert ash, and to perform this combustion reaction in a manner which does not produce objectionable odors. It is further highly desirable that these operations be conducted at relatively moderate temperatures which have a minimal requirement for auxiliary fuel.

In operating certain fluid bed installations, it has been found that the organic waste streams are contaminated with chlorides. This is particularly prevalent in installations associated with population centers and refineries at coastal locations. The ground water near the seacoast is often briny and inevitably intrudes into the waste lines. Certain industrial wastes contain chlorides which are present as the consequence of reactions used to produce commercial products. Tanker ballast water is another waste material containing both organics and chlorides. Such chloride-contaminated waste streams are difficult to incinerate because chlorides in general, e.g., the alkali metal chlorides, have low melting points and give rise to formation of low-melting eutectics at the required combustion temperatures, which causes the ash to become sticky and, when this occurs in fluid bed units, the bed defluidizes.

The chlorides present can, of course, be volatilized, if the gas volume per unit weight of chlorides is high enough, by raising the operating temperature sufficiently. This solution is obtained only at the price of increased fuel consumption, which may make the process uneconomic. Further, the increase in operating temperature may be no solution at all, since other constituents likely to be present, such as sodium and potassium sulfates, would melt at the higher temperatures and defluidize the bed.

Accordingly, there is a real need for a practical fluid bed process for incineration of chloride-containing organic waste streams.

It is the object of this invention, in the process of fluid bed incineration of chloride-containing combustible waste streams, to prevent formation of deleterious amounts of low-melting chloride eutectics and thus maintain fluidization of the bed at an operating temperature at which essentially complete combustion is obtained.

It is a further object of the invention to prevent formation of deleterious amounts of low-melting eutectics during fluid bed incineration of chloride-containing combustible waste streams by the introduction of a suitable additive to form relatively high-melting-point constituents while driving off a volatile chloride compound.

Other objects and advantages will become apparent to those skilled in the art from the following description, taken in conjunction with the drawing, in which:

The FIGURE is a view in part in perspective and in part in section of a typical fluid bed incinerator.

Generally speaking, the present invention involves the introduction into a fluid bed reactor operating at an elevated temperature on a combustible waste stream containing chlorides, of a source of sulfur, whereby all or a substantial part of the chlorides in the fluidized bed are converted to sulfates having a relatively high melting point.

More specifically, sulfuric acid may be added directly to a chloride-containing waste stream prior to introduction into the fluidized bed, or alternatively, the sulfuric acid may be separately injected directly into the bed. Sulfur dioxide or elemental sulfur may also be added directly into the fluidized bed. Other sulfur sources may be utilized including $H_2S$, $SO_3$, pyrite ($FeS_2$), pyrrhotite (FeS), ferrous sulfate ($FeSO_4$), ferric sulfate ($Fe_2(SO_4)_3$), and ammonium sulfate (($NH_4)_2SO_4$). The reaction in the fluidized bed will produce HCl and one or more of the relatively refractory sulfates $Na_2SO_4$, $K_2SO_4$, $CaSO_4$ and $MgSO_4$, as principal products, and may produce other sulfur-containing products depending upon the sulfur source utilized.

The operating temperature of the bed is maintained in the range from 1150°F to 1450°F and preferably, from 1300°F to 1375°F. Lower temperatures tend to produce odors due to incomplete combustion, and higher temperatures may lead to melting of certain bed constituents. Essentially complete combustion, as required in this invention, eliminates from the stack gases certain noxious and toxic gases and utilizes to the maximum the available heat in the combustible material.

In the following discussion, it will be understood that the reference to "alkali metal" includes essentially the elements sodium and potassium, which are commonly found in the waste feed materials with which this invention is concerned. Further, the term "alkaline earth metal" is to be taken as descriptive primarily of the elements magnesium and calcium, again elements commonly found in the waste feed materials of concern.

While the present invention is directed to the conversion of alkali and alkaline earth metal chlorides to alkali and alkaline earth metal sulfates, it should be understood that small amounts, say less than about 1%, by weight, of alkali and alkaline earth metal chlorides may be present in admixture with the sulfates produced, for it has been found that such small amounts are not particularly detrimental in the fluid bed and may be tolerated. In some cases, small amounts of these chlorides, by melting, seem to aid in pelletization of the sulfate bed constituents and pellets of the sulfates may accumulate in the sand bed and there perform the same function as the sand itself. However, such pelletization is dependent upon operating conditions and does not always occur and, in those cases in which pellets are not formed, the sulfates are removed from the bed by elutriation and are washed out of the gases in the scrubber.

Referring now to the FIGURE, the reactor 20 comprises an outer shell 10 which is capped by a cover 12 from which the exhaust conduit 15 extends. The conical portion 18 forms the bottom of the reaction 20 and is provided with a clean-out port 19. An inlet pipe 23 controlled by valve 25 is provided through which fluidizing gas is supplied to the reactor 20. An overflow pipe 45 controlled by valve 46 has the function of permitting withdrawal of excess bed material.

In the reactor 20 there is maintained a bed 31 of finely divided solids supported on a substantially horizontal constriction plate 33. The reactor illustrated in the FIGURE is arranged for the introduction of a solid feed such as dewatered activated sewage sludge. The solids are placed in a hopper 35 from which they are fed into the bed by the screwfeeder 36 operated by motor 37. In addition, a number of fuel guns 38 are positioned about the periphery of the shell 10 for direct injection of auxiliary fuel into the fluidized bed 31. Of course, if the waste material is in the form of liquids such as is the case with oil refinery wastes, it may be fed directly into the bed by means of a plurality of feed pipes as is well known in the art and not illustrated here. The constriction plate 33 comprises a flat steel plate containing numerous orifices, perforations or apertures 41 in each of which, if desired, a short replaceable tuyere 43 may be fitted. The tuyeres 43 illustrated are of the anti-sifting type to prevent downward sifting of the bed material during shutdown, but this is a matter of choice and structure of the sifting type may be used if desired. While feeding directly into the bed has been illustrated, it is also possible to introduce the waste feed upon the upper surface of the fluid bed by spraying or dropping the feed through a pipe (not illustrated) which penetrates the cover 12 or the upper part of the reactor shell 10. It is also sometimes advantageous to introduce air directly into the freeboard over the fluid bed, and air inlet pipes 34 are provided for this purpose.

In accordance with this invention, the sulfur introduced into the bed must be in a form in which it is available for reaction with the chlorides. The source of sulfur is chosen on the basis of the overall cost per unit weight of HCl evolved. This, in turn, depends upon the efficiency of the conversion of the sulfur source to the desired sulfates. For example, when sulfur or $FeS_2$ are utilized as the source of sulfur, some of the sulfur will be lost as $SO_2$ in the gas stream and this will necessarily have to be scrubbed out in addition to the HCl, which adds to the cost of the operation. Since the addition of sulfuric acid does not result in the generation of $SO_2$ gas, the addition of sulfuric acid is, on this ground, to be preferred. However, waste pickle liquor ($FeSO_4$ plus $H_2SO_4$) or copperas ($FeSO_4 \cdot 7H_2O$) may, in some cases, be available as a low-cost source of sulfur with high efficiency since little or no $SO_2$ is generated.

The exit gas produced in the process is scrubbed with water containing calcium carbonate or lime, since these are relatively inexpensive means of fixing the hydrochloric acid in an innocuous form. In fact, hydrochloric acid is so soluble in water, that water itself can be used alone followed by appropriate neutralization thereafter.

In the fluid bed reactor operated in accordance with this invention, while hydrochloric acid is evolved as one product of the reaction between sulfur and the chlorides, all carbonates formed during combustion are converted to sulfates so that the bed contains a mixture of sulfates such as $Na_2SO_4$, $K_2SO_4$, $MgSO_4$ and $CaSO_4$ together with inert materials such as $SiO_2$, $Fe_2O_3$, etc.

For the purpose of illustrating the advantages of the invention to those skilled in the art, the following Example is given:

EXAMPLE

A waste feed for incineration is composed of a centrifugated activated sludge having the following composition:

| Wt.% | Constituent |
| --- | --- |
| 1.2 | $CaCO_3$ |
| 0.9 | $Na_2SO_4$ |
| 0.78 | NaCl |
| 0.18 | $CaCl_2$ |
| 0.06 | KCl |
| 0.95 | Hydroxides (Fe, Al, etc.) |
| 5.93 | Volatile organics |
| Balance | Water |

A fluid bed reactor of the type disclosed in the FIGURE is brought up to the operating temperature of 1175°F by injection and combustion of fuel and then the sludge feed is introduced directly into the bed by means of a screwfeeder. After about 18 hours of operation under these conditions, the bed defluidized and the operation was shut down. Examination of the bed material revealed evidence of melting, in that clinkers had formed.

The above process is repeated with the same feed material, but in this case, sulfuric acid is added to and mixed with the sludge feed prior to introduction into the bed at the rate of 20.8 kilograms of acid per metric ton of feed. Operation is successfully carried out at a bed temperature of 1365°F for an extended period without apparent functional deterioration. The presence of substantial amounts of HCl is detected in the exit gas and it is calculated that about 6.7 kilograms of HCl are generated per metric ton of feed in this case. After shutdown and examination of the bed material, it is found that substantial amounts of sulfate (primarily sodium, potassium, magnesium and calcium sulfates) had formed in and become a part of the bed material.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the appended claims.

I claim:

1. A process for destruction by incineration of aqueous, primarily organic combustible waste including as a contaminating constituent one or more chlorides of the alkali and alkaline earth metals, comprising the steps of,
   a. establishing a fluidized bed of inert particles which is maintained in the fluidized state by an upward flow of an oxygen-containing gas,
   b. introducing the aqueous combustible waste directly into said fluidized bed for combustion therein,
   c. maintaining the operating temperature of said fluidized bed in he range from 1150°F to 1450°F by in-bed combustion of said aqueous waste and introduction of additional fuel directly into said bed as required to assure odor-free destruction of said waste, d. preventing formation of low-melting eutectics in said fluidized bed and consequent defluidization by introducing sulfur into said bed for reaction in the fluidized bed environment with said chloride-containing contaminant and with carbonates formed during combustion, thereby forming an inert ash composed of relatively refractory sulfur-containing compounds of said alkali and alkaline earth metals and the volatile reaction product, HCl, and e. removing said HCl with the exhaust combustion gases and disposing of said inert ash.

2. The fluid bed process of claim 1 wherein the sulfur is provided in the form of $H_2SO_4$ and is mixed with the waste prior to introduction into the fluid bed.

3. The fluid bed process of claim 1 wherein the sulfur is provided in the form of $H_2SO_4$ and is injected directly into the fluid bed.

4. The fluid bed process of claim 1 wherein the sulfur is provided in a form selected from the group consisting of $H_2SO_4$, elemental sulfur, $H_2S$, $SO_2$, $SO_3$, $FeSO_4$, $Fe_2(SO_4)_3$, $FeS_2$, $FeS$ and $(NH_4)_2SO_4$.

5. The fluid bed process of claim 1 wherein the unreacted alkali and alkaline earth metal chlorides remaining in the solid product following reaction amount to less than about 1%, by weight, of the sulfate compounds produced.

6. The fluid bed process of claim 1 wherein the operating temperature of the fluid bed is maintained in the range from about 1300°F to about 1375°F.

7. The fluid bed process of claim 6 wherein the sulfur is added as $H_2SO_4$.

8. The fluid bed process of claim 7 wherein residual chlorides in the solid reaction products amount to less than about 1%, by weight, thereof.

9. A fluid bed process for the incineration of a combustible waste containing one or more chlorides of the alkali and alkaline earth metals, comprising introducing the combustible waste into a fluid bed operating at a temperature in the range from about 1300°F to about 1375°F in the presence of oxygen to assure essentially complete combustion, adding $H_2SO_4$ for reaction with the waste material in an amount sufficient to react with substantially all the chlorides present in the waste material to form, as the products of the reaction, relatively refractory alkali and alkaline earth metal sulfates and hydrogen chloride, there being less than about 1%, by weight, of residual chlorides in the solid reaction products, and removing hydrogen chloride and elutriated sulfates with the exit gases.

* * * * *